US006388772B1

(12) United States Patent
Williams

(10) Patent No.: US 6,388,772 B1
(45) Date of Patent: May 14, 2002

(54) ELECTRONIC FACSIMILE CALENDARING METHOD AND APPARATUS

(76) Inventor: Marvin L. Williams, 1152 Settlers Way, Lewisville, TX (US) 75067

( * ) Notice: Subject to any disclaimer, the term of this patent is extended or adjusted under 35 U.S.C. 154(b) by 0 days.

(21) Appl. No.: 08/234,432

(22) Filed: Apr. 26, 1994

(51) Int. Cl.[7] .................................................. H04N 1/40
(52) U.S. Cl. ....................... 358/448; 358/400; 358/434; 364/705.08
(58) Field of Search ................................. 358/400, 403, 358/407, 434, 438, 442, 444, 448, 468; 364/705.08

(56) References Cited

U.S. PATENT DOCUMENTS 5,070,470 A * 12/1991 Scully et al. ........... 364/705.08
5,084,769 A    1/1992 Miura .......................... 358/403

OTHER PUBLICATIONS

Schmandt, "Phoneshell: the Telephone as Computer Terminal," Proceedings ACM Multimedia 93, Aug. 1983, pp. 373–382.

IBM Technical Disclosure Bulletin, "Calendar Event Status Association Mechanism" Feb. 1993, pp. 25–28.

"Xerox Software Marries Faxes and Computers", *The Washington Post*, Tuesday, Mar. 24, 1992, p. C2.*

* cited by examiner

Primary Examiner—Thomas D. Lee

(57) ABSTRACT

A method and apparatus for scheduling electronic calendar events using a facsimile transmission. The invention may be initiated using a designated facsimile transmission sheet or sheets which can invoke a specified electronic calendar operation. A data processing system, upon reception of the facsimile transmission sheet, interprets the sheet for a specified electronic calendar operation. Upon validation of specified operations, the operations are directed to an electronic calendar for processing. In addition, specified facsimile images from the facsimile transmission may be associated with a calendar event or events. Upon an originator's request, confirmation on the status of the electronic operations are directed to specified facsimile devices.

14 Claims, 7 Drawing Sheets

Fig. 2

UPDATE CALENDAR FORM

USER ID OF CALENDAR TO UPDATE
A B C D E F G H I J K L M N O P Q R S T U V W X Y Z -

ACKNOWLEDGE CONFIRMATION: YES NO
FAX NUMBER TO ACKNOWLEDGE

DATE OF EVENT TO UPDATE
1 2 3 4 5 6 7 8 9 0

1 2 3 4 5 6 7 8 9 0

TIME OF EVENT TO UPDATE
1 2 3 4 5 6 7 8 9 0 AM PM

ELECTRONIC FACSIMILE CALENDARING METHOD AND APPARATUS

BACKGROUND OF THE INVENTION

1. Technical Field of the Invention

The present invention relates to data processing systems communicating with electronic facsimile services and relates more particularly to data processing systems that accept electronic calendar requests from electronic facsimile (fax) devices.

2. Description of the Related Art

Conventional facsimile transmissions allow users to send designated forms to a facsimile server for processing. In addition, the server may be able to send files via facsimile transmissions to remote users. For example, Xerox Corp. has developed a product PaperWorks™ which allows users to designate entries on a facsimile transmittal sheet for processing by a computer with a facsimile adapter card. The product then recognizes the facsimile sheet utilizing Optical Character Recognition (OCR) to interpret entries. Subsequently, the product distributes documents stored on disk to other facsimile devices. Such a product limits itself to local personal computer operations and does not provide for electronic messaging within a network.

A data processing system may include an electronic calendar application which allows the user to maintain a schedule of upcoming events of interest to him. Calendar events may have a start time and a duration. When adding a new event to the electronic calendar, the calendar application may check the existing calendar events for events that conflict in time with the event to be added. However, data processing systems, even those that include calendar applications, do not permit a user from a facsimile device to schedule an electronic calendar event.

Often a user of a data processing system who is mobile, described as a traveling user, wishes to update an electronic calendar. Prior methods require the traveling user to carry a computer or access a computer to establish a connection with the electronic calendar application. These techniques require the user to either carry, physically, a computer or find a computer to establish an electronic connection to the calendar. With the advent of facsimile devices, users have abundant access to facsimile devices. In today's environment, hotels, restaurants, airports, etc. provide facsimile devices to the general public. It is advantageous to provide a mechanism by which facsimile devices can be used to direct commands to a user's electronic calendar service. Users want the capability of adding and deleting electronic calendar events utilizing typical facsimile devices. Moreover, user's desire the capability of having a facsimile image associated to an electronic calendar event.

SUMMARY OF THE INVENTION

In accordance with the invention, a method and apparatus are provided for scheduling electronic calendar events using a facsimile transmission. In one embodiment, the invention provides a methodology whereby facsimile images are associated to a calendar event. In still another embodiment the invention permits a user to schedule the electronic calendar event using a facsimile transmittal. The invention may be initiated using a designated facsimile transmission sheet or sheets which can invoke a specified electronic calendar operation. A data processing system, upon reception of the facsimile transmission sheet, interprets the sheet for a specified electronic calendar operation. Upon validation of specified operations, the operations are directed to an electronic calendar for processing. In addition, specified facsimile images from the facsimile transmission are associated with a calendar event or events. Upon an originator's request, confirmation on the status of the electronic operations are directed to specified facsimile devices.

BRIEF DESCRIPTION OF DRAWINGS

The novel features believed characteristic of the invention are set forth in the appended claims. The invention itself however, as well as a preferred mode of use, further objects and advantages thereof, will best be understood by reference to the following detailed description of an illustrative detailed embodiment when read in conjunction with the accompanying drawings wherein:

FIG. 2 is an example of a facsimile transmission sheet utilized to implement the method of the present invention;

While the invention will be described in conjunction with a preferred embodiment, it will be understood that the description is not intended to limit the invention to that embodiment. On the contrary, the invention is intended to cover all alternatives, modifications and equivalents as may be included within the spirit and scope of the invention as described by the appended claims.

DETAILED DESCRIPTION OF THE PREFERRED EMBODIMENT

Figure 1:
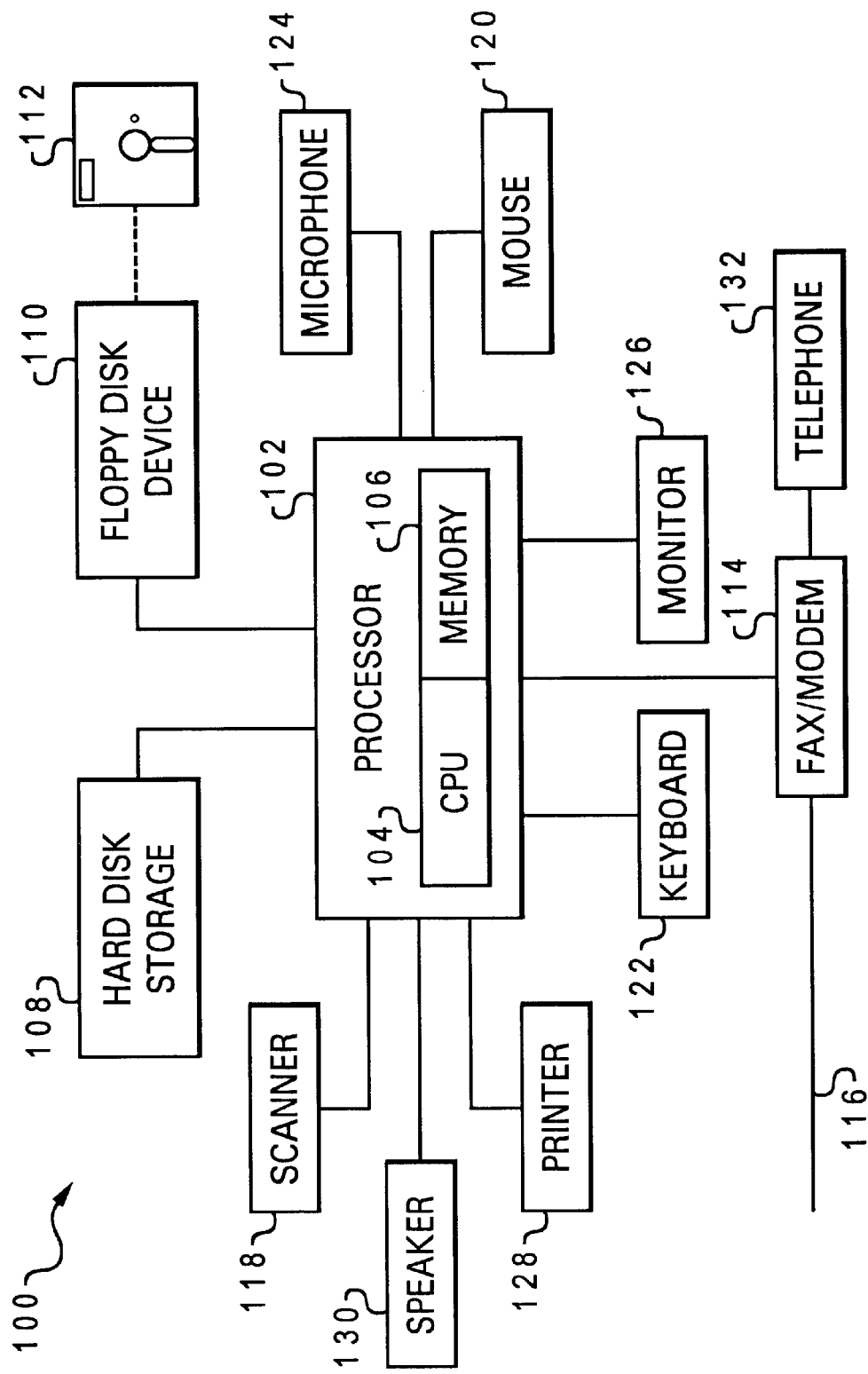
FIG. 1 is a block diagram of an apparatus used in performing the method of a preferred embodiment of the present invention and forming a part of the apparatus of a preferred embodiment of the present invention.

With reference now to the Figures, and in particular with reference to FIG. 1, there is shown, in block diagram form, an apparatus according to the present invention. The apparatus includes a data processing system 100. The data processing system 100 includes a processor 102, which includes a central processing unit (CPU) 104 and memory 106. Additional memory, such as a hard disk file storage 108 and a floppy disk device 110 may be connected to the processor 102. Floppy disk device 110 may write to or read from a removable diskette 112 which may have computer program code recorded thereon that implements portions of the present invention in the data processing system 100. Inputs may also be received from a fax/modem 114, which is connected to a telephone line 116, and from a microphone 124. The data processing system 100 also includes user interface hardware, such as a mouse 120 a keyboard 122 and a scanner 118, for the allowing user input to the processor 102. The data processing system 100 also includes visual display devices, such as monochrome or color display monitor 126 and a printer 128, for rendering visual information. The data processing system may also include an audio output device, such as speaker 130 for rendering audio information. A telephone 132 may be connected to the telephone line 116 through the fax/modem 114.

With reference now to FIG. 2, there is depicted an example of a transmission sheet 500 in accordance with the preferred embodiment of the invention. Transmission sheet 500 contains a plurality of fields for directing specific commands to an electronic calendar. Fields 505 and 510 depict orientation bars which permit a receiving service to detect the orientation of transmission sheet 500 as the sheet is being transmitted through a facsimile device. Field 515 depicts a grid form for designating user identification of an electronic calendar user. A user can designate a symbol by marking the corresponding column for each row of a symbol of field 515, to signify a user identifier (id) of an electronic calendar user. Designation fields, 515, 520, 525, 530 and 535 allow the user to designate specific information by marking the column of the corresponding symbol for each row. Field 520 allows a user to designate an acknowledgement from an electronic calendar user. Field 525 allows a user to designate a date on the electronic calendar for modification. Field 535 allows a user to designate a time on the electronic calendar for modification. Field 530 is where the user can designate a call back telephone number of a facsimile device to receive a confirmation on the status of the electronic calendar modification.

Figure 3:
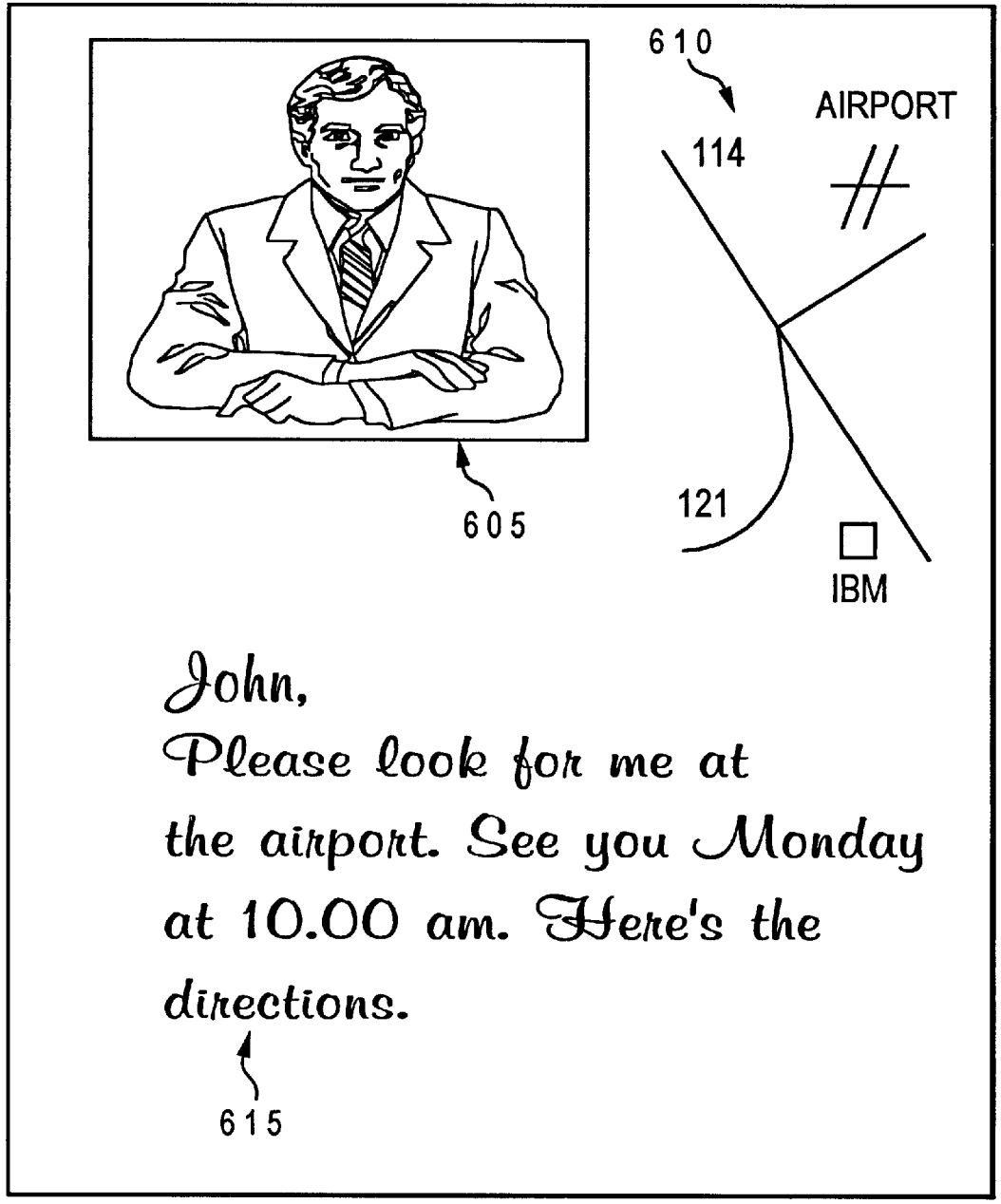
FIG. 3 is an example of a facsimile transmission sheet with an image for association to an electronic calendar event.

With reference now to FIG. 3, there is depicted an example of a sheet 600 with an image that a user wishes to associate to an electronic calendar event. Sheet 600 may directly or indirectly accompany the sheet 500 of FIG. 2 within the same facsimile transmission. Sheet 600 includes image information that the user wishes to convey to an electronic calendar. For example, photograph 605 illustrates an image that the user wishes to convey on to an electronic calendar. Map 610 illustrates a drawing that the user wishes to convey on to the electronic calendar. Handwritten note 615 illustrates textual information that the user wishes to convey on to the electronic calendar.

Figure 4:
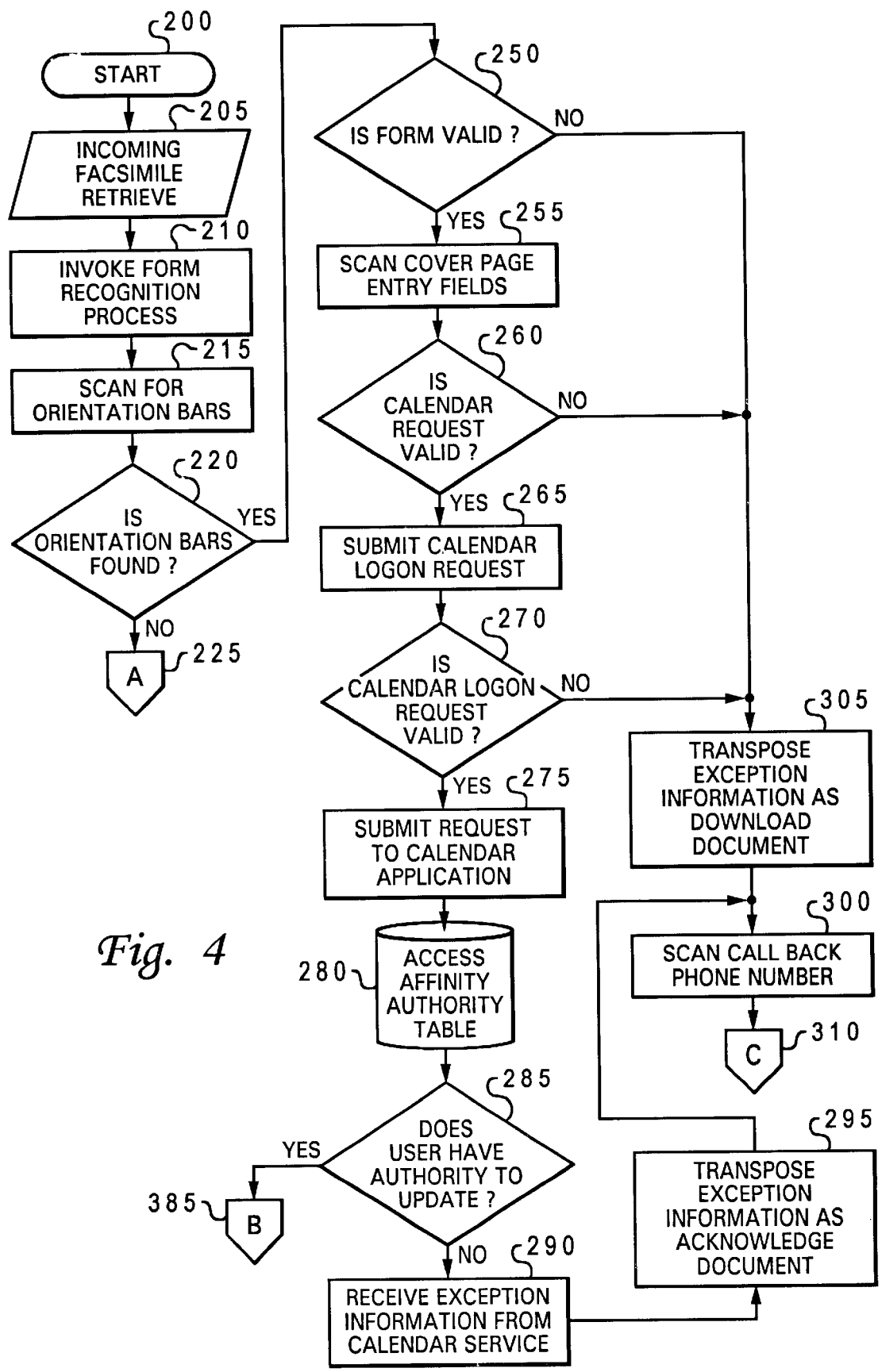
FIG. 4 is a high-level flowchart illustrating the method of the present invention.

With reference now to FIG. 4, there is depicted a high level flowchart of the preferred embodiment. The process begins at block 200 and continues to block 205 where an incoming facsimile transmission is retrieved from a facsimile device, such as fax/modem 114 in FIG. 1. The process then continues to block 210 which activates the recognition process. This recognition process allows for the detection of specified fields designed for initiating a calendar request, such as those fields illustrated in FIG. 2. The process then continues to block 215 where the process scans for orientation bars 505 and 510 illustrated in FIG. 2. The use of orientation bars allows the process to detect the orientation of the document being transmitted. Those skilled in the art recognized that often facsimile documents are transmitted upside down from the perspective of a receiving facsimile device. The process continues to block 220 which determines whether the orientation bars are detected. If the orientation bars are not detected the process continues to off-page connector A, block 225. Thereafter the process then continues to FIG. 5, on-page connector A, block 230. The process then continues to block 235 where the facsimile transmittal is relinquished to the facsimile services which may be enabled during activation of the invention. The process continues to block 240 which reports that the orientation bars were not found within the facsimile transmittal. The process continues to block 245 which logs the status of the missing orientation bars.

Those skilled in the art can appreciate that users need the ability to subsequently review the activity of a facsimile service. Block 245 allows for specified logging of information when the invention cannot process the transmittal in accordance with the present invention.

Returning to block 220, if the orientation bars are found, the process continues to decision block 250 which determines whether a form-id is valid by recognizing sheet 500 of FIG. 2. The form-id may be specified from the aggregation of grids on a specified sheet. Form-id permits the process to execute various types of operations based on the form-id, such as update a calendar entry or view a calendar entry. Block 250 allows the invention to process only requests the enterprise deems as valid. Those skilled in the art can appreciate the selectivity the invention allows to an enterprise that wishes to control electronic calendar requests from facsimile transmittals. If the form id is not valid the process continues to block 305 which considers the invalid form id as an exception case of the invention. Block 305 transposes information from the exception case with default information designated by an enterprise. This allows for the facsimile transmittal still to be processed, but with information transposed to the transmittal for exception procedures. For example, this process permits the enterprise to have an administer's calendar updated whenever an invalid form id is detected. The process continues from block 305 to block 300 which scans the facsimile transmittal for the call back telephone number to dial for confirmation. It should be noted that process 305 can transpose a telephone number for when an exception case is detected.

Returning to block 250, detecting a valid form id continues the process to block 255 where the facsimile transmission sheet 500 is scanned for entry fields. These entry fields designate specific calendar request information. This allows an electronic calendar to be modified according to the parameters designated within the fields, such as the marking of specified fields, 515, 520, 525, 530 and 535 in FIG. 2. The process continues to block 260 which determines the validity of the calendar request. If the calendar request is not valid as specified by the enterprise then the process continues once again to block 305 which transposes the exception case as information into the facsimile transmittal. The process once again continues to block 300 where the facsimile transmittal is scanned for the call back telephone number to dial for confirmation, such as designated in element 530 of FIG. 2. The process then continues to the off-page connector C, block 310.

Returning to block 260, if the calendar request is valid the process continues to block 265, which submits a calendar logon request, this permits the invention to have access to the electronic calendar application or service. The process proceeds to block 270 which determines whether the logon request successfully completed. If the logon request did not successfully complete, the process continues to block 305 which transposes this exception case as information into the facsimile transmittal. The process once again continues to block 300 where the facsimile transmittal is scanned for a telephone number to dial for confirmations. Thereafter the process then continues to the off-page connector C, block 310.

Returning to block 270, if the logon request is valid the process continues to block 275 which submits the specified request to the calendar application. Those skilled in the art recognized that the request may be an add event to the electronic calendar or a delete event from the electronic calendar. Other related calendar requests may be specified into the facsimile transmittal. The process continues to block 280 which accesses the affinity authority table. Thereafter the process continues from 280 to decision block 285 which determines whether a requester, a user who makes a request, has proper authority for the specified calendar request. If the requester has proper authority the process continues to off-page connector B, block 385.

Returning to block 285, if the requester does not have proper authority the process continues to block 290 which receives the exception information from the calendar service, i.e., calendar application. For example, this information may contain reason codes why the requester did not have proper authority to perform the specified calendar request. The process then continues to block 295 which transposes the exception case as information into the facsimile transmittal. The process once again continues to block 300 where the facsimile transmittal is scanned for a telephone number to dial for confirmations. The process then continues to the off-page connector C, block 310.

Figure 5:
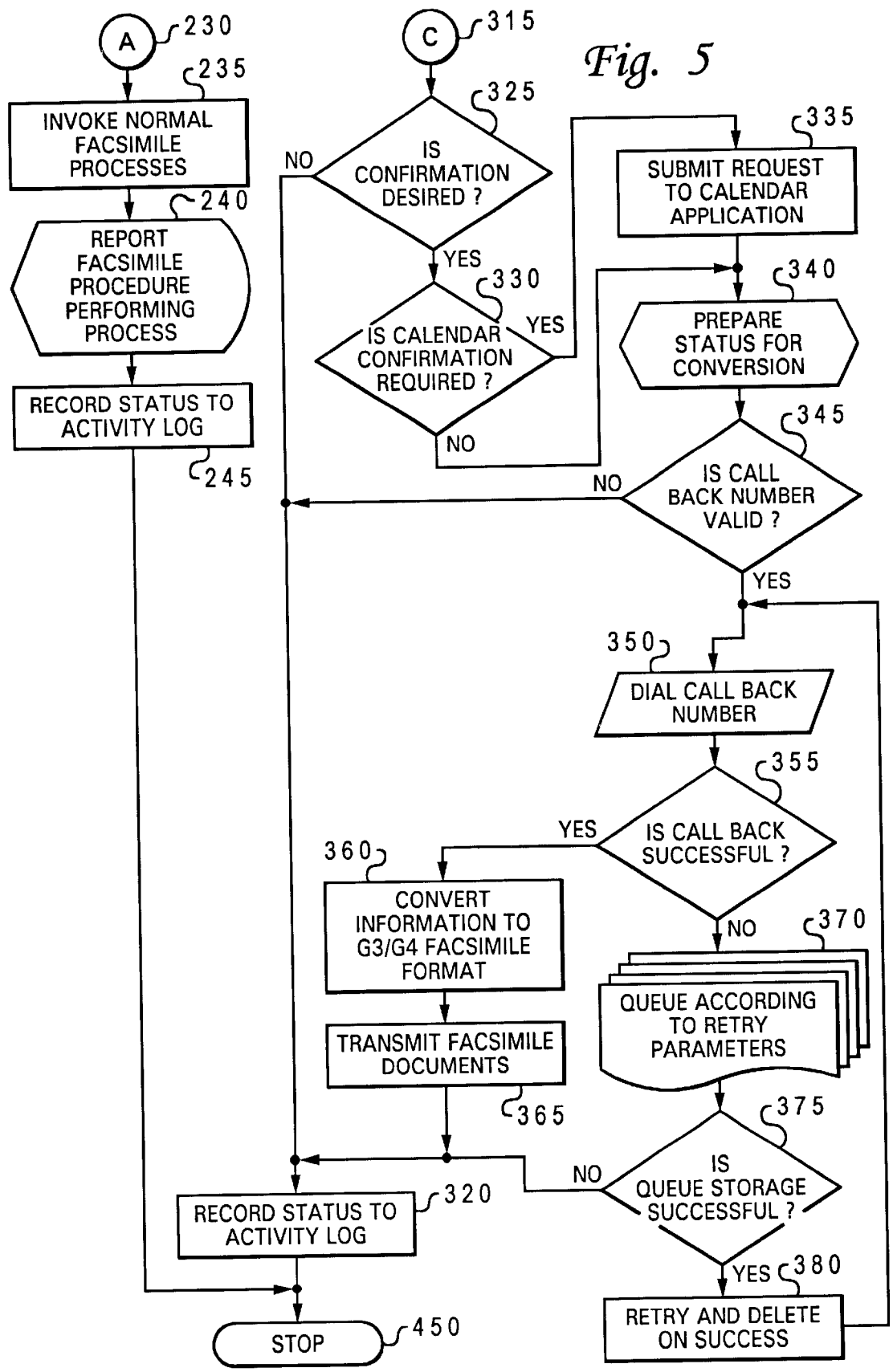
FIG. 5 is a high level flowchart illustrating a continuation of FIG. 4.

Returning to off-page connector C, block 310, the process continues on FIG. 5 with on-page connector C, block 315. Thereafter the process continues to decision block 325 which determines whether confirmation is desired for the facsimile transmittal. This process allows the requester to be conveyed the status of the calendar request. Determination of confirmation can be detected by the existence of the call back telephone number as scanned in block 300, FIG. 4. Presence of the call back telephone number indicates that confirmation is desirable by the requester. If confirmation is not desired then the process continues to block 320 which records the status as no-confirmation-desired. Thereafter the process continues to block 450 and terminates.

Returning to block 325, if confirmation is desired the process continues to decision block 330 which determines whether a calendar confirmation is desired. The calendar confirmation allows for confirmation that a user has received the calendar request, such as the event has been heard or viewed by the owner of the calendar. It should be noted that this differs from the previous confirmation which sent a confirmation to the originator of the request that the request has been accepted by the calendar application. If a calendar confirmation is desired, the process continues to block 335 where the request for calendar confirmation is submitted to the calendar application. Thereafter the process continues to block 340 which prepares the status for submission for conversion to the facsimile transmittal. Returning to block 330 if no confirmation is desired, the process continues once again to block 340 where the status is prepared for submission for conversion to the facsimile transmittal.

Returning to block 340 the process continues to decision block 345, which determines whether the call back telephone number is valid. This process allows the enterprise to determine if the telephone number should be dialed from the specified location. Those skilled in the art can appreciate this allows an enterprise to selectively prohibit long distance telephone calls and unauthorized telephone numbers, e.g., 900 telephone numbers. If the telephone number is invalid the process continues to block 320 where the activity is recorded and thereafter continues to block 450 where the process terminates.

Returning to block 345 if the call back telephone is valid the process continues to block 350 which dials the call back telephone number. Thereafter the process continues to decision block 355 which determines whether the call back was successful. For example, the call back may fail due to the telephone line being busy. If the call back is not successful the process continues to block 370 which queues the call for a retry as specified by the retry parameters. The process continues to decision block 375 which determines whether the queue storage was successful. If the storage is not successful the process continues to block 320 where once again the status is recorded to the activity log. The process thereafter continues to block 450 where the process terminates.

Returning to block 375, if the queue storage is successful the process continues to block 380 where the telephone number within the queue is retried. Upon successful retry the telephone number is deleted from the queue. The process then continues to block 350 where once again the process dials the telephone number. Thereafter the process reiterates for when block 355 determines that the call back is unsuccessful and block 375, the storage queue, is successful.

Returning to block 355, if the call back is successful the process continues to block 360 where the information as accumulated in the process, is converted to Group 4 (G4) facsimile format. Those skilled in the art recognized that other formats, such as Group 3 (G3) may be utilized for facsimile transmission. The process thereafter continues to block 365 which transmits the facsimile documents to the designated destination as specified in the call back telephone number. The process continues to block 320 which logs the status of the transmission. Thereafter the process continues to block 450 where the process terminates.

Figure 6:
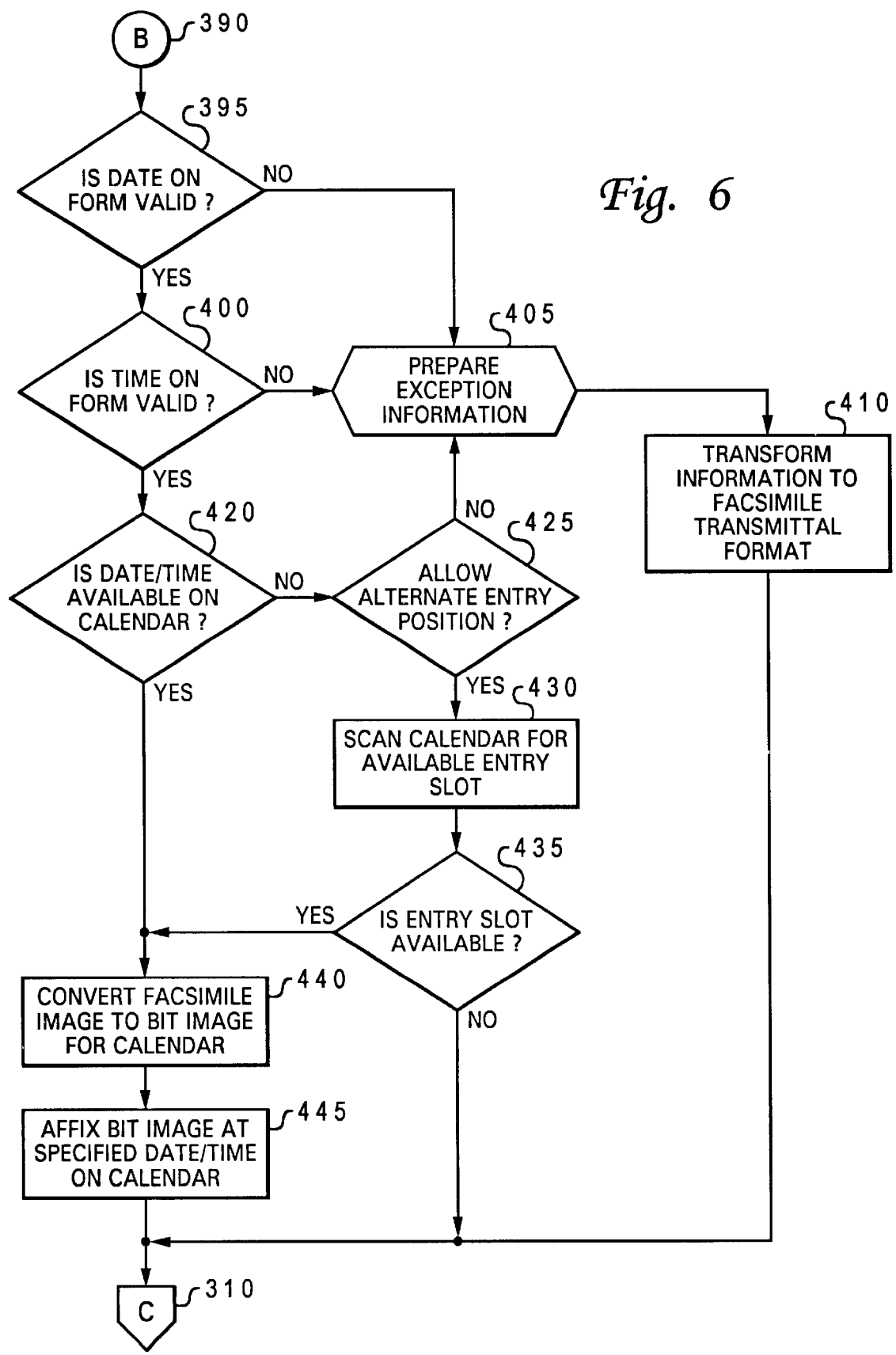
FIG. 6 is a high level flowchart further illustrating a continuation of FIG. 4.

Returning to off-page connector B, block 385 continues the process to block 390 of FIG. 6. The process continues from block 390 to decision block 395 which determines if the date as specified in the facsimile transmittal for the calendar request is valid. For example, the user may be requesting to schedule a meeting for a date which has already transpired. If the date is valid the process continues from block 395 to decision block 400 which determines whether if the time as specified in the facsimile transmittal is valid. If the time is valid the process continues to decision block 420 which determines whether if the date and time are available on the calendar. This process queries the calendar for the requested date and time to determine availability of posting an event. If the date and time are available the process continues to block 440 which converts the facsimile image to a bit image format for display on the electronic calendar within a monitor such as monitor 126, in FIG. 1. Those skilled in the art recognized that a pluralities of graphical formats exist to display an image. The process continues to off-page connector 310. Thereafter the process continues to block 315, FIG. 5, on-page connector C, which once again continues from this point on as described previously.

Returning to block 395, FIG. 6, if the date is invalid the process continues to block 405 which prepares the exception information, that is, the invalid date information is edified before being transposed. For example, generating textual information which describes the exception condition in detail. Returning to block 400, if the time is invalid the process continues to block 405 which once again prepares the exception information, that is, the invalid time information is edified before being transposed.

Returning to block 405, after the exception information is prepared the process continues to block 410 which transform the exception information to a facsimile format, such as G3 or G4. The process continues to off-page connector C, block 310. Thereafter the process continues to FIG. 5, on-page connector C, block 315, which once again continues the process from this point forward as described previously.

Returning to block 420, if the date/time is not available on the electronic calendar the process proceeds to decision block 425 which determines whether an alternate date/time, i.e., entry, is allowed for the requested date/time. If no alternate entry is allowed then the process continues to block 405 which once again prepares the exception information for transformation. The process continues to block 410 which transforms the exception information to a facsimile format, such as G3 or G4. Thereafter the process continues to off-page connector C, block 310. The process continues once again to FIG. 5, on-page connector C, block 315, which continues the process as previously described.

Returning to block 425, if an alternate entry position is allowed the process continues to block 430 which scans the electronic calendar for an available entry slot, that is, an available entry position to post the requested calendar event. The process continues to decision block 435 which determines whether an entry slot is available. If an entry slot is available the process continues to block 440 which converts the facsimile image to a bit image format for the electronic calendar. The process continues to off-page connector C, block 310. The process then continues to FIG. 5, on-page connector C, block 315, which once again continues the process as previously described.

Returning to block 435, if no entry slot is available, the date/time is considered unspecified for confirmation purposes. The process continues to off-page connector C, block 310. Thereafter the process then continues to FIG. 5, on-page connector C, block 315, which once again continues the process from this point forward as described previously. Alternatively, no available entry slot may be considered as an exception situation, thus continuing the process to block 405 and thereafter continuing as previously described.

Figure 7:
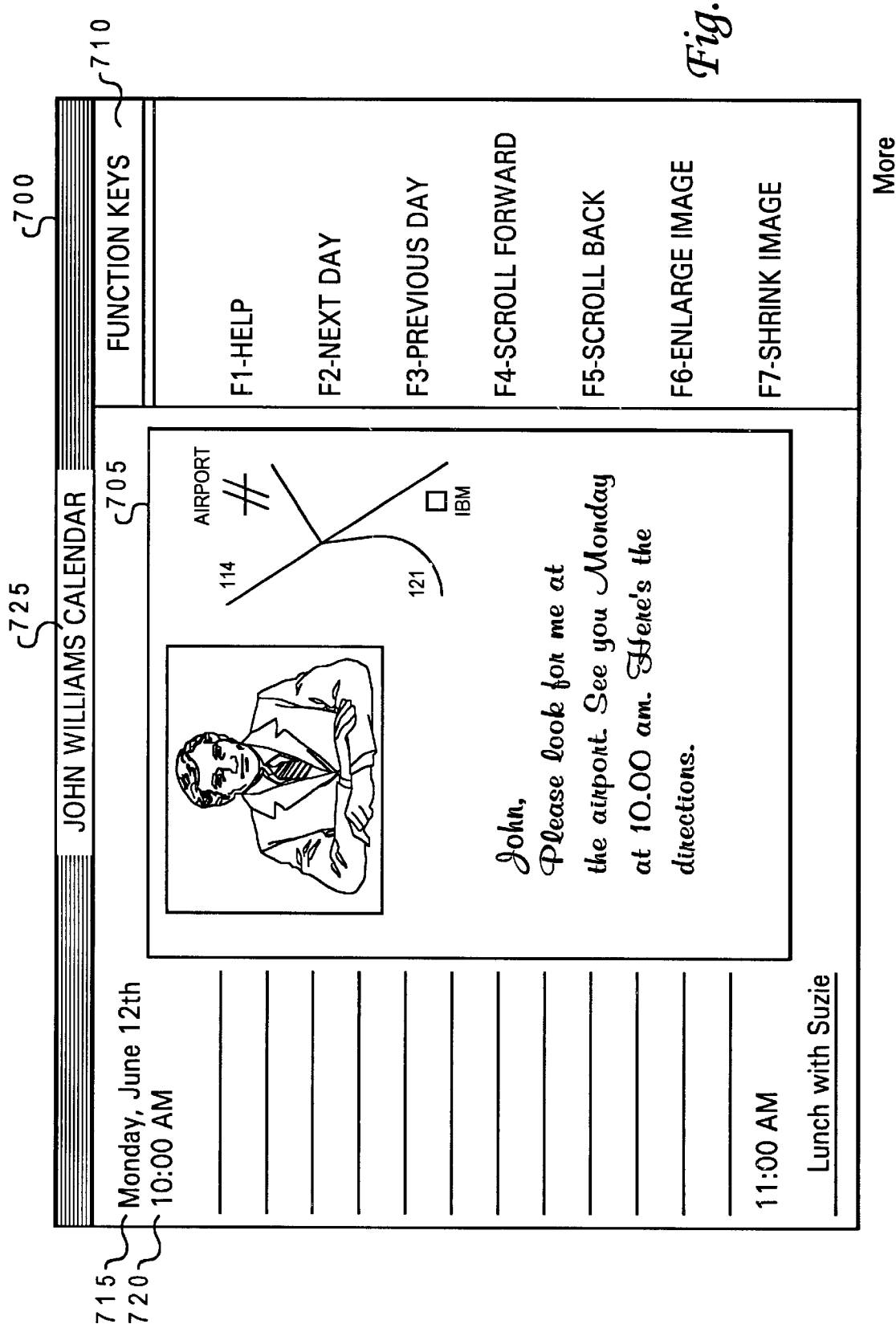
FIG. 7 is an illustration of an electronic calendar display after implementing the preferred method of the invention from the transmission of FIG. 2 and FIG. 3.

With reference now to FIG. 7, an electronic calendar display 700 is shown for a user identified in title bar 725. Display 700 includes a date 715 as might have been designated in field 525 of FIG. 2. Element 725 illustrates the name of the electronic calendar user who received the modification request from a facsimile transmission. Display 700 also includes 720, which was designated in field 535 of FIG. 2. Display 700 also includes an image 705 associated with time 720 and date 715, which corresponds to the image of sheet 600 of FIG. 3. In addition, display 700 illustrates a set of function keys 710 to manipulate image 705.

What is claimed is:

1. A method for scheduling an event within an electronic calendar maintained by a calendaring application within a data processing system, said data processing system having a plurality of users enrolled therein, said method comprising:

receiving a facsimile transmission which includes a calendaring request at a computer within said data processing system;

extracting said calendaring request from within said facsimile transmission;

in response to extracting a calendaring request from said facsimile transmission, submitting said calendaring request to said calendaring application;

evaluating said calendaring request within said calendaring application; and in response to a successful evaluation of said calendaring request, scheduling said event within said electronic calendar maintained by said calendaring application within said data processing system.

2. The method for scheduling an event to an electronic calendar of claim 1, wherein said step of evaluating said calendaring request comprises validating a date and a time for said event within said calendaring application.

3. The method for scheduling an event to an electronic calendar of claim 1, wherein said step of evaluating said calendaring request comprises determining if a user that transmitted said calendaring request has authority to schedule said event.

4. The method for scheduling an event to an electronic calendar of claim 1, and further comprising the step of associating a graphical image transmitted in conjunction with said calendaring request with said scheduled event within said electronic calendar.

5. The method for scheduling an event to an electronic calendar of claim 1, and further comprising the step of notifying a user of a status of processing said calendaring request.

6. The method for scheduling an event to an electronic calendar of claim 1, and further comprising the step of transmitting a confirmation via facsimile to a user indicating that said event has been scheduled to said electronic calendar.

7. The method for scheduling an event to an electronic calendar of claim 1, and further comprising the step of validating said calendaring request prior to submitting said calendaring request to said calendaring application.

8. A system for scheduling an event within an electronic calendar maintained by a calendaring application within a data processing system, said data processing system having a plurality of users enrolled therein, comprising:

means for receiving a facsimile transmission which includes a calendaring request at a computer within said data processing system;

means for extracting said calendaring request from within said facsimile transmission;

means, responsive to extracting a calendaring request from said facsimile transmission, for submitting said calendaring request to said calendaring application;

means for evaluating said calendaring request within said calendaring application; and means, responsive to a successful evaluation of said calendaring request, for scheduling said event within said electronic calendar maintained by said calendaring application within said data processing system.

9. The system for scheduling an event to an electronic calendar of claim 8, wherein said means for evaluating said calendaring request comprises means for validating a date and a time for said event within said calendaring application.

10. The system for scheduling an event to an electronic calendar of claim 8, wherein said means for evaluating said calendaring request comprises means for determining if a user that transmitted said calendaring request has authority to schedule said event.

11. The system for scheduling an event to an electronic calendar of claim 8, and further comprising means for associating a graphical image transmitted in conjunction with said calendaring request with said scheduled event within said electronic calendar.

12. The system for scheduling an event to an electronic calendar of claim 8, and further comprising means for notifying a user of a status of processing said calendaring request.

13. The system for scheduling an event to an electronic calendar of claim 8, and further comprising means for transmitting a confirmation via facsimile to a user indicating that said event has been scheduled to said electronic calendar.

14. The system for scheduling an event to an electronic calendar of claim 8, and further comprising means for validating said calendaring request prior to submitting said calendaring request to said calendaring application.

* * * * *